Figure 8:
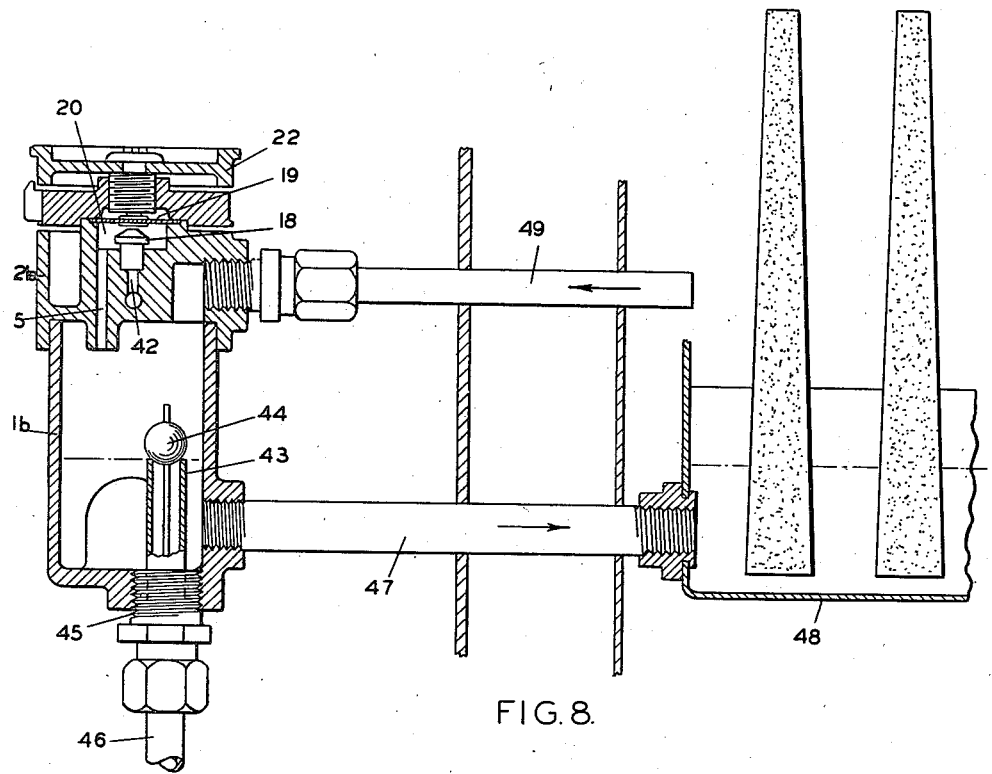

Sept. 16, 1947.   O. J. KUENHOLD, SR   2,427,530
HUMIDIFYING SYSTEM WATER FEED DEVICE
Original Filed March 21, 1939   4 Sheets-Sheet 1
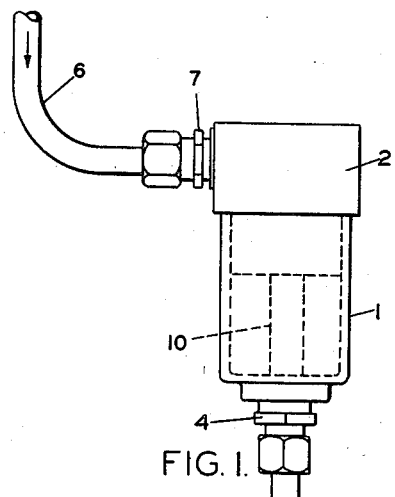
FIG. 1.
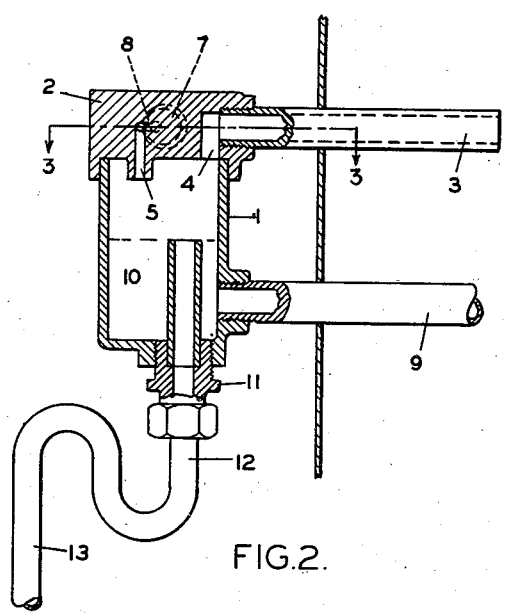
FIG. 2.
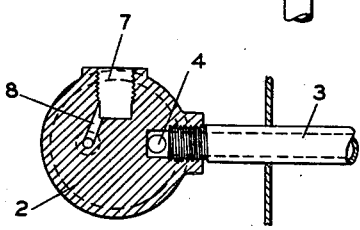
FIG. 3.
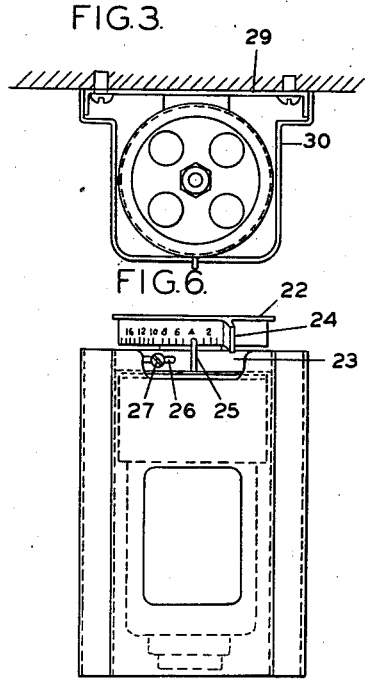
FIG. 6.
FIG. 4.
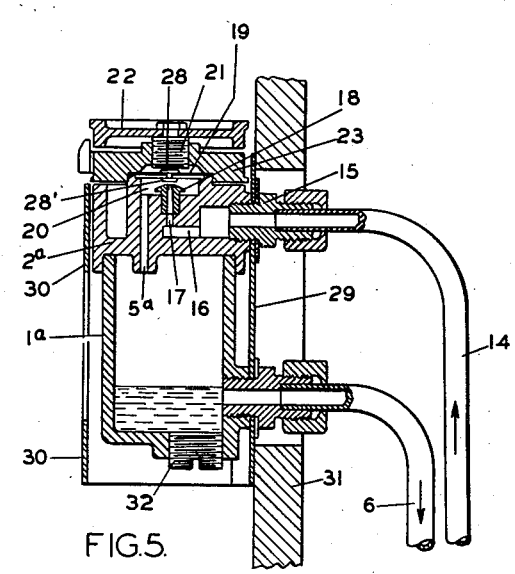
FIG. 5.
INVENTOR.
OTTO J. KUENHOLD. SR.
BY
Fay, Macklin, Gohrick and Williams
ATTORNEYS Sept. 16, 1947.  O. J. KUENHOLD, SR  2,427,530
HUMIDIFYING SYSTEM WATER FEED DEVICE
Original Filed March 21, 1939   4 Sheets-Sheet 2

INVENTOR.
OTTO J. KUENHOLD, SR.
BY Fay, Macklin, Golrick and Williams
ATTORNEYS

EVAPORATOR No 1
at level below feed-control unit

Patented Sept. 16, 1947

2,427,530

UNITED STATES PATENT OFFICE 2,427,530

HUMIDIFYING SYSTEM WATER FEED DEVICE

Otto J. Kuenhold, Sr., Shaker Heights, Ohio, assignor to Monmouth Products Company Original application March 21, 1939, Serial No. 263,265. Divided and this application May 31, 1941, Serial No. 396,101

3 Claims. (Cl. 137—21)

The present invention relating as indicated to humidifying system water feed devices, has more particular reference to apparatus and water feed and control units which are adapted to be employed in a humidifying system operating upon the principle such as more fully set forth in my United States Letters Patent No. 2,166,414, granted July 18, 1939. Briefly stated, such humidifying system operating principle depends primarily upon the fact that the natural humidity in a dwelling or building during a heating season varies in proportion to the temperature of the outside atmosphere. My system for controlling room humidity is to add to this natural humidity a constant and uniform amount of moisture. This is accomplished simply by feeding water at a constant metered rate to an evaporator of adequate capacity. The water feed rate thereby determines the rate of evaporation and hence the percentage of artificial humidity added to the natural humidity.

In order for the apparatus which controls the feed and evaporation of the water in such a humidifying system to operate satisfactorily, and in accordance with the above outlined principle, it is of primary importance that all of the water whose constant flow is so regulated and controlled, enters the evaporating unit and remains there until completely evaporated, except in mild weather (e. g., 32° F. or above) when proportionately less evaporation is required, and when, because the temperature of the circulating air passing the evaporator is at a lower average temperature, proportionately less evaporation will be obtainable. In this latter instance, provision must be made in the water feed devices or apparatus to accommodate the flow of excess water which cannot be evaporated, and in such a manner that it will not interfere with the satisfactory and efficient operation of the humidifying system as a whole.

With this end in view, the subject matter of my present invention relates to the novel construction and improvement in certain water feed devices, which, for the sake of convenience, I have hereinafter termed a "feed cup" and a "feed control unit." The objects and advantages of these devices shall become apparent as the following description proceeds.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 7:
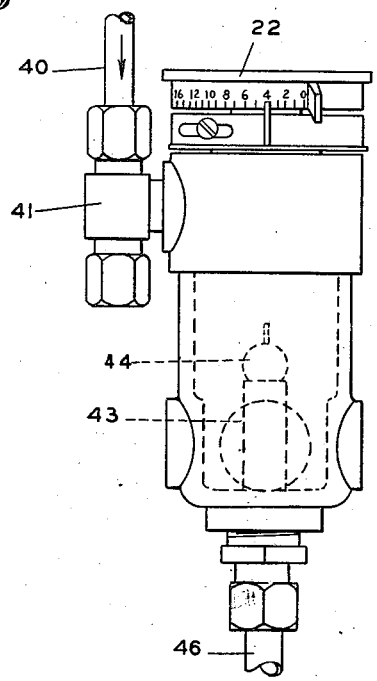
Figure 9:
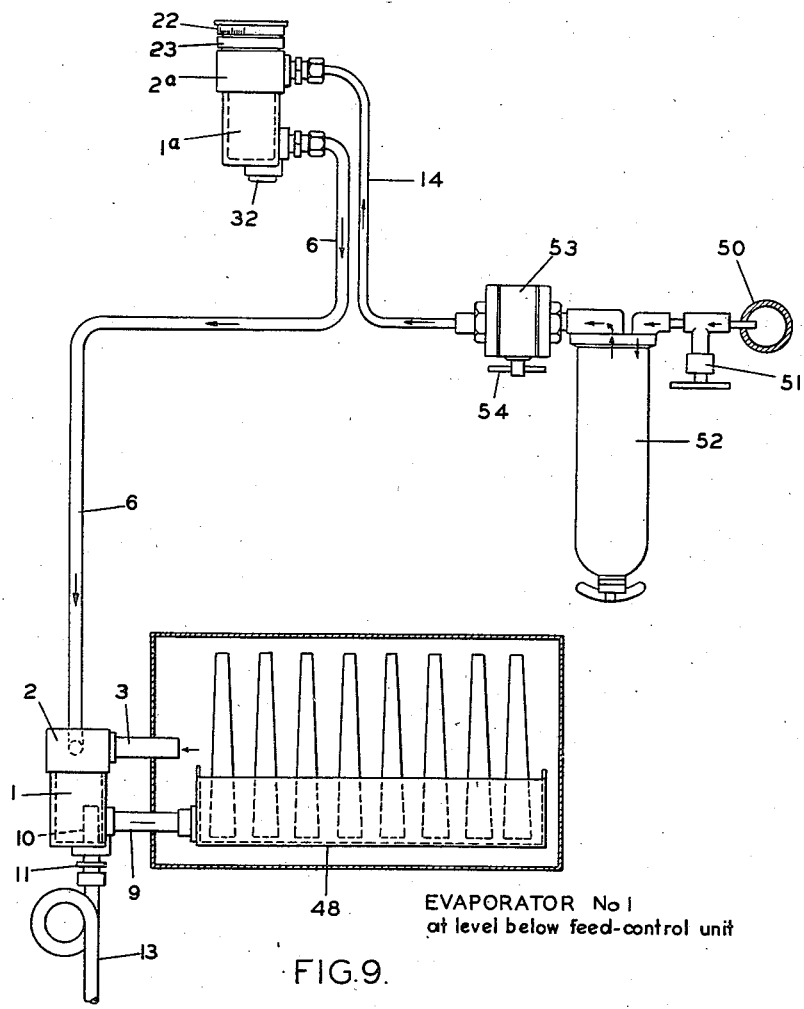
Figure 10:
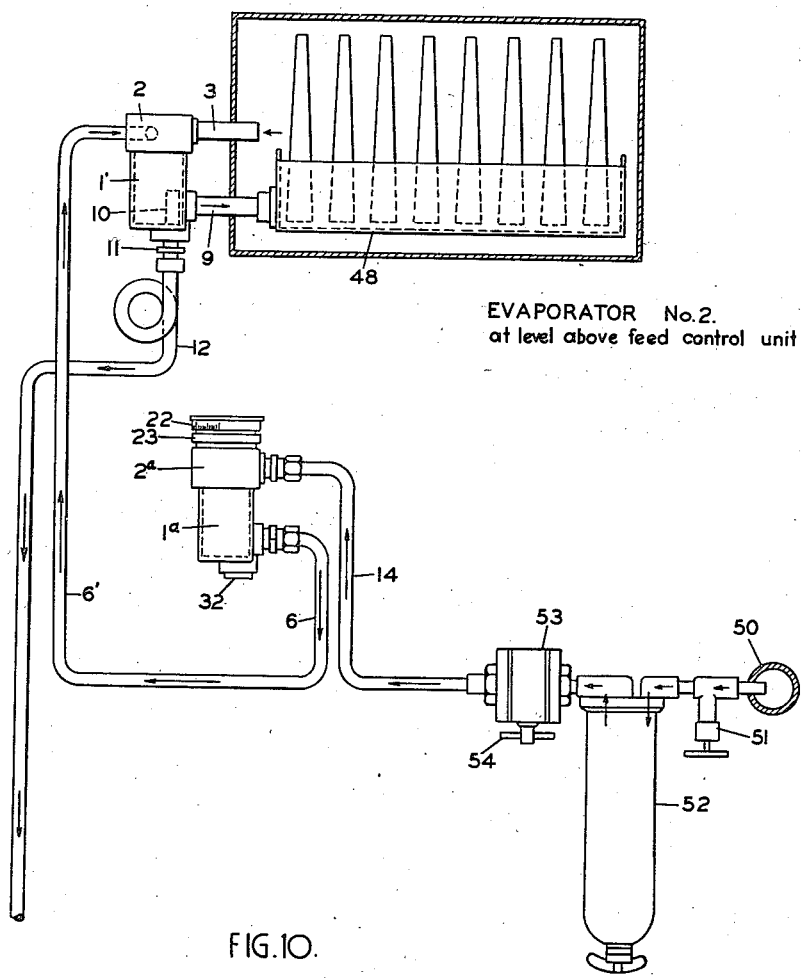

In said annexed drawings:

Fig. 1 is an elevational view of the feed cup; Fig. 2 is a vertical sectional view taken upon a plane normal to that of Fig. 1; Fig. 3 is a horizontal sectional view taken substantially along line 3—3 of Fig. 2; Fig. 4 is an elevational view of the feed control unit; Fig. 5 is a vertical sectional view taken upon a plane normal to that of Fig. 4; Fig. 6 is a top plan view of the feed control unit; Fig. 7 is an elevational view of a combined feed cup and feed control unit wherein elements of construction of Figs. 1 to 6 inclusive have been incorporated into a single structure; Fig. 8 is a vertical sectional view taken on a plane normal to that of Fig. 7; Fig. 9 is a more or less diagrammatic view illustrating the assembly, connections and mode of operation of the apparatus when the evaporator is below the level of the feed control unit; and Fig. 10 is a view similar to Fig. 9, but illustrating a condition in which the evaporator is above the level of the feed control unit.

Referring more particularly to the drawing, the construction of the feed cup is shown in Figs. 1 to 3 thereof. The transparent molded plastic cup 1 is fitted and cemented into the cap 2 so that the interior space is sealed except for the one air connection and three water connections shown.

The air tube 3 opens into the plenum chamber in which the water pan is placed and communicates the static air pressure of the plenum chamber to the interior of the feed cup 1 through drilled port 4. The detailed construction of a suitable water pan or evaporator is more fully set forth and described in my United States Letters Patent No. 2,236,538, granted April 1, 1941. The water inlet tube 6 connects to the horizontal chamber 7 in the cap or cover 2, through the passage 8 to the vertical inlet passage 5. The tube 9 leads from the lower portion of the cup 1 to the water pan or evaporator. The vertical tube 10, force fitted into threaded fitting 11, is open at the top and communicates with overflow tube 13 through the S-shaped air trap 12. The height of tube 10 determines at what level water shall be by-passed to the overflow tube. This overflow level may be varied by partly unscrewing fitting 11, or screwing it up further. The air trap 12 prevents escape of air but permits free exit of water. The trap is essential so that the static pressure in the feed cup can be maintained by the static pressure tube 3 to be exactly the same as in the plenum chamber or duct in which the water pan is placed.

The water supply through tube 6 is controlled by a control instrument of some kind. In my system of humidity control, the control instrument or feed control unit is one designed as shown by Figs. 4, 5, and 6. These views show a form of feed control unit which is especially adapted for use in a room.

The transparent cup 1a in the structure of Figs. 4, 5, and 6 is the same as for the feed cup 1 previously described. The cover 2a of the cup 1a is also the same except that it is differently drilled and machined. As employed in the feed control unit, it is a valve body, fitted and cemented on the transparent cup as shown. The water enters through supply tube 14, tube connector fitting 15 and horizontal passage 16, then travels vertically upward in passage 17 through the valve seat 18, the outlet port of which is controlled by flexible diaphragm 19, but in service permitting the water to pass into annular recess 20 from which it gravitates downward freely in enlarged passage 5a dripping into the transparent cup 1a from which it escapes through tube 6 which carries it to the feed cup 1 as shown in Fig. 1. The flexible diaphragm 19 is tightly clamped to the valve body 2 at its periphery by the valve cover 23 which is held down by screws not shown. Flat flexible spring means 28 at the bottom of the flexible diaphragm normally flexes the center of the diaphragm upward away from the valve seat 18. A central flat headed metal rivet 28' is passed through the flat spring, the diaphragm and a washer above the diaphragm, the stem of said rivet being peened over to form a central button head. A valve screw 21 having a very fine pitched thread is screwed through a drilled and threaded hole in the valve cover 23. This screw is perfectly flat and smooth at the bottom which engages the center of the button head and when the valve screw is turned down far enough it flexes the diaphragm downward so that the flat head of the central diaphragm rivet 28' accurately engages the valve seat, closing the valve.

On the upper end of the valve screw 21 a graduated dialed wheel 22 is secured as shown. Rotating this dial wheel opens or closes the valve approximately .00012 inch per graduation, which increase or decrease corresponds to a change of 1 gallon per day in the rate of water flow through the valve. The dial graduations are numbered as shown to indicate the rate of water flow in gallons per day.

A movable indicator comprising a projection 25 having a slot 26 is anchored in position on the cover 23 by screw 27. The projection 25 of this indicator is in the path of stop lug 24 of the dial wheel. This limits the farthest open position of the dial wheel and, what is especially important, it limits the tightness of valve closure. Without this limitation, the comparatively large diameter of the dial wheel and very fine pitch of the thread of the valve screw 21, would permit the valve to be closed with considerable force, indenting the valve seat into the flat head of the diaphragm rivet more each time the valve is closed and this would change the distance of valve opening, consequently change the rate of water flow so that it would no longer correspond with the water flow rate indicated by the dial. By providing projection 25 and stop lug 24 and adjusting the position of the indicator so that stop lug 24 engages projection 25 when the valve is closed, no damage to the interior valve members can occur and it is possible to maintain water flow rates closely corresponding to the rate of flow indicated upon the dial wheel 22.

The diaphragm 19 itself must be flexible and rather soft. By providing a hard unyielding diaphragm center, specifically the flat head of the rivet 28', it is possible to have a flexible soft diaphragm and yet the center will not expand, contract or change dimensions, especially the distance between valve screw contact point and valve seat contact point.

When the control instrument above described is mounted upon the wall of a room in a residence it is preferably enclosed in a housing such as the one shown in which 29 is a base screwed to the lath and plaster 31 as indicated, and 30 is a case which may be snapped in position as shown.

A threaded plug 32 is inserted in the tapped hole in the bottom of the cup 1a and, of course, takes the place of the fitting 11 when the transparent cup is used in the feed control unit of Figs. 4 to 6, instead of in the feed cup of Figs. 1 to 3.

In the construction shown in Figs. 7 and 8, the elements of the previously described feed cup and feed control unit have been incorporated or merged into a single structure which can more conveniently be termed a "direct feed control unit," and is adapted to be attached directly to the water pan or evaporator. This direct feed control unit embodies both of the functions of the feed cup and feed control unit in that it determines the rate of water feed and maintains the predetermined water level in the evaporating pan, with provision for the overflow of water feed in excess of that required for evaporating capacity.

Now referring more particularly to Figs. 7 and 8, the structure shown therein utilizes the same transparent molded plastic casting 1b as in the previously described cups 1 and 1a. The cap or cover 2b, atmospherically sealed to the top of the cup 1b has a vertical inlet passage 5, a metering valve 18 and flexible diaphragm 19 and dial wheel 22 similar to the corresponding previously described elements. The water feed inlet tube 40 connects to the inlet fitting 41 which leads through the horizontal passage 42 to the valve orifice 18.

A vertical tube 43 having the ball float valve 44 seated on its upper end, is mounted in the fitting 45 in the bottom of the cup 1b. The overflow tube 46 connects with the threadably adjustable bushing 45. The tube 47 connects from the side of the lower portion of the cup 1b to the evaporating pan 48. The air tube 49 connects between the cap 2b and the plenum chamber in which the evaporating pan 48 is located, thus balancing the air pressure surrounding the evaporating pan with the pressure in the upper portion of the cup 1b.

After the structure of the feed cup and control units above described is understood, the essential features of the complete system can be better understood by reference to Fig. 9.

The water required is drawn from a city supplied water pipe 50 then passes through a shut-off valve 51, then through the water filter 52 which removes all undissolved contents. The microscopically clear water then passes through the pressure governor 53 (for detailed description of the latter, see my copending application Serial No. 263,264, filed March 21, 1939), which reduces its pressure to a predetermined very low pressure which is automatically maintained at substantial constancy regardless of pressure fluctuations on the inlet side or changes in feed rate on the outlet side.

This prepared water then passes through corrosion resisting duct 14 to the control instrument 1a which may be assumed as being located in a first floor room. The filter 52 and governor 53 are usually located near the basement ceiling.

The dial 22 of the control instrument 1b is set so that the water is passed, constantly and without variation, at a desired rate of flow, for instance at a feed rate which, when evaporated, will increase the humidity of the rooms being served by 17 per cent points of relative humidity over and above the natural humidity that would otherwise exist and regardless of changes in outdoor temperature.

From the control instrument the water will then flow through tube 6 to the feed cup 1 of No. 1 evaporator. This evaporator is placed in a warm air conveying duct or in the plenum chamber of an air heating furnace, or is otherwise subjected to currents of air to be moistened.

The water then flows from the feed cup into the water pan or evaporator and, assuming adequate evaporating capacity of the evaporator, controls the rate of evaporation and hence the per cent points of humidity increase. But if the evaporating rate reduces (due to reduced circulating air temperature) until the water can no longer be evaporated at the feed rate, then the water level in both pan and feed cup will rise, and at length all feed water beyond evaporating ability of the evaporator, will overflow into the overflow tube 13 instead of continuing to pass to the evaporator. In the ordinary method of handling surplus water supply to an evaporator, a supply pipe is simply connected to the evaporator, and an overflow tube is connected to the evaporator at the desired elevation, so that when more water is supplied to the evaporator than can be evaporated, the water level in the pan will rise, and, at a predetermined level the excess water will flow out through the overflow tube. This ordinary method has a number of disadvantages, among which may be enumerated the following: (1) The overflowing water will carry heat away and the cold water entering the evaporator will reduce the water temperature, thus reducing evaporating capacity considerably. In cases of modern automatic furnace control, the intermittent operation with extended "off" periods will accentuate this disadvantage. (2) Due to evaporation of water from evaporating pans, the heated water remaining is saturated with undissolved mineral salts, commonly termed "lime." In the overflow tube, the water becomes cooler, and being supersaturated with lime, the lime is precipitated or deposited on the walls of the overflow tube, rapidly clogging it, and requiring occasional tube replacement. (3) In some localities, floating precipitates occur in evaporating pans. These clog overflow outlets, which are at the water line of the evaporating pan. (4) If the home owner desiring to obtain more evaporation, turns the feed rate up beyond the capacity of the pan to evaporate, the warmed water escaping and incoming surplus cold water will reduce temperature of water in the pan, resulting in reduced instead of increased evaporation, exactly the reverse of what is wanted. The present method of handling the surplus water supply overcomes all of the foregoing disadvantages, since the overflowing water, in excess of that required for evaporation, does not enter the evaporator.

Evaporator No. 1, as shown in Fig. 9, is below the level of the feed control unit 1a as is usual—the feed control on the wall of a room and the evaporator in the furnace in the basement. However, there are cases where the evaporator is placed at higher level than the control unit, for instance in an overhead warm air duct, such as evaporator No. 2 in Fig. 10. In such case the tube 6 carrying the metered water supply from the feed control unit 1a is continued as shown by 6' passing upward, instead of downward, and to the feed cup 1' of evaporator No. 2 instead of to the feed cup 1 of evaporator No. 1.

In this case the water will be forced upwardly under a pressure head equal to the difference in level between the feed control unit and the feed cup of evaporator No. 2, seldom over 8 feet, or 3½ pounds per square inch. Because of this back pressure in the feed control unit 1a, the latter must be air tight.

Note that in the case of the system embracing evaporator No. 1, the owner can see the drip rate at the control in the room and also at the feed cup in the basement, a factor of needed convenience. This same advantage is retained in the system embracing evaporator No. 2. An air pocket is formed in the cup portion or drip space of the feed control unit 1a. Air released from the water in transit maintains this air pocket and although the entrapped air will be under slight pressure, the water level in the cup will be at the outlet level. Surplus air released from the water drops will pass through tubes 6 and 6', in the form of air bubbles and the said tubes must be of sufficient internal diameter to freely pass the said air bubbles.

Although the water supplied is filtered there may still remain a tendency for the very fine valve port in the control unit to partially and gradually clog. This is due to several causes such as dust and filings originally in the tubing and fittings, metallic colloidal oxides formed by action of solutes in the water upon the metallic tubing and fittings, alum and similar colloids present in the water and which pass the filter, accumulations of tiny air bubbles. The cumulative effect of these under certain circumstances cause a very slow and gradual diminishment of water flow through the metering valve 18 in the feed control unit, so that the rate of flow will be less than indicated by the dial. To clear the metering valve of such accumulations and to restore the water flow to original volume for any given dial setting, the pressure governor is provided with a purge lever. By twisting this lever, the pressure governor is caused to pass water at much higher than its normal and very low pressure as explicitly set forth in my copending application Serial No. 263,264, filed March 21, 1939. The rapid rush of water through the system and especially through the metering valve of the feed control unit washes out all films or other deposits very effectively.

This application is a division of my copending application, Serial No. 263,265, filed March 21, 1939.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A device for controlling the rate of flow of water for a humidifying system, comprising the combination of an atmospherically sealed housing member having a transparent body portion and a metallic cover portion mounted thereon, an inlet passage in said cover portion, an outlet passage in the lower part of said transparent body portion, an adjustable diaphragm valve located in said inlet passage, and an overflow conduit leading from the interior of said housing member at a point above said outlet passage.

2. A device for controlling the rate of flow of water for a humidifying system, comprising the combination of an atmospherically sealed housing member having a transparent body portion and a metallic cover portion mounted thereon, an inlet passage in said cover portion, a metering valve orifice located in said inlet passage, a flexible diaphragm mounted adjacent said orifice, a rigid, non-yielding element mounted at the center of said diaphragm and adapted to contact said orifice, and an overflow outlet leading from the interior of said housing member.

3. A liquid feed device, comprising: a closed housing, for receiving liquid, having a liquid inlet opening and a liquid delivery opening, correlated so that the liquid is separated and drops through space within said housing, and having also a transparent portion permitting view of the liquid dropping through space, said housing having liquid overflow outlet means for limiting the liquid level therein; and means precluding flow of air through said outlet means thereby to prevent flow of air through said housing and thereby maintaining the air in said housing in saturated condition and preventing dehydration within said housing.

OTTO J. KUENHOLD, Sr.

REFERENCES CITED

The following references are of record in the file of this patent:

UNITED STATES PATENTS

| Number | Name | Date |
| --- | --- | --- |
| 1,249,939 | Falwell | Dec. 11, 1917 |
| 1,815,603 | Weatherhead | July 21, 1931 |
| 568,934 | Wilgus | Oct. 6, 1896 |
| 1,230,832 | Stokes | June 19, 1917 |
| 1,225,416 | Khotinsky | May 8, 1917 |
| 1,109,768 | Laux | Sept. 8, 1914 |
| 1,774,790 | Di Tella | Sept. 2, 1930 |
| 1,116,901 | Loetzer | Nov. 10, 1914 |
| 2,212,620 | Scully | Aug. 27, 1940 |
| 1,179,711 | Fitts | Apr. 18, 1916 |
| 627,561 | Williams | June 27, 1899 |
| 1,118,649 | Halter | Nov. 24, 1914 |
| 2,316,848 | Evans | Apr. 20, 1943 |

FOREIGN PATENTS

| Number | Country | Date |
| --- | --- | --- |
| 363,560 | France | May 8, 1906 |
| 47,420 | Sweden | July 21, 1920 |